Jan. 26, 1971 F. J. KARLE 3,558,229

METHOD FOR OBTAINING IMPROVED OUTPUT SIGNALS FROM A DUAL BEAM SPECTROMETER

Filed May 2, 1969 2 Sheets-Sheet 1

INVENTOR.
Franklin J. Karle
BY Earl D. Ayers
AGENT

METHOD FOR OBTAINING IMPROVED OUTPUT SIGNALS FROM A DUAL BEAM SPECTROMETER

Filed May 2, 1969 2 Sheets-Sheet 2

INVENTOR.
Franklin J. Karle
BY Earl D. Ayers
AGENT

United States Patent Office 3,558,229
Patented Jan. 26, 1971

3,558,229
METHOD FOR OBTAINING IMPROVED OUTPUT SIGNALS FROM A DUAL BEAM SPECTROMETER

Franklin J. Karle, Midland, Mich., assignor to The Dow Chemical Company, Midland, Mich., a corporation of Delaware Filed May 2, 1969, Ser. No. 821,219
Int. Cl. G01j 3/42
U.S. Cl. 356—95 4 Claims

ABSTRACT OF THE DISCLOSURE

This invention relates to method and means for obtaining an improved output signal from a dual beam electrical ratioing infrared spectrometer. The output signal is obtained by comparing the sample beam signal (measuring beam) to the reference beam signal standard beam). The spectrometer uses a single radiation source. The source beam is alternatively directed at 15 hertz rate through the reference and the sample paths of the instrument. The two beams are recombined and form a single output signal from the detector. The output signal is amplified and separated into its two components by a synchronous rectifier. The two signals are compared to obtain the ratio of sample to reference signal strength, which is a measure of energy absorption in the sample. Since the two energy beams are alternate 15 hertz half cycles, the output signal of each is displaced in time by $\frac{1}{30}$ sec. and cannot be directly compared. Each time separated signal is connected to a parallel resonant tuned transformer. The windings are tuned to 15 hertz and have a high Q. The Q factor is a quality of the resonant circuit, $Q=wL/R$, and determines the frequency bandwidth and the decay time constant of the circuit. Since the output signal frequency is only 15 hertz, the two signals can be directly compared by phase inversion of one of the signals.

BACKGROUND OF THE INVENTION

This invention relates to a method and apparatus for obtaining an improved output signal from a dual beam electrical ratioing spectrometer.

In such dual beam electrical ratioing spectrometers which use a single radiation source the dual beam signals are alternate half cycles and thus are time displaced from each other. In order to accomplish the ratioing of the signals and to derive a useful output signal from an associated servo-mechanism, some form of time delay circuit, such as magnetic tape recording, mechanical delay line, integrated signal matching, and rectifying and filtering, are used.

These circuits either introduce additional mechanical equipment, increase the response time of the spectrometer, or put unwanted requirements on the optical system.

Accordingly, a principal object of this invention is to provide an improved dual beam electrical ratioing spectrometer.

Another object of this invention is to provide an improved dual beam electrical ratioing spectrometer which time delay of the signals is achieved by means of passive circuit components.

A further object of this invention is to provide an improved method of comparing the reference and sample signals in a dual beam electrical ratioing spectrometer.

In accordance with this invention the detection and electrical signal circuits are similar to prior art dual beam electrical ratioing spectrometers until the reference and sample signals are separated on leaving the detector. Each signal, on separation, is then coupled to a parallel resonant circuit (or other Fourier transform circuit) to achieve a 15 hertz output signal from which the higher beam interrupting frequency is eliminated. The sample and reference signals are then compared using usual ratio ratioing circuitry on phase inversion of one of the signals.

The advantages achieved in using a Fourier transform circuit include using less components, passive rather than active circuit components, less noise in the output circuit signal, and faster scanning speed.

The invention, as well as additional objects and advantages thereof, will best be understood when the following detailed description is read in connection with the accompanying drawings, in which.

Figure 1:
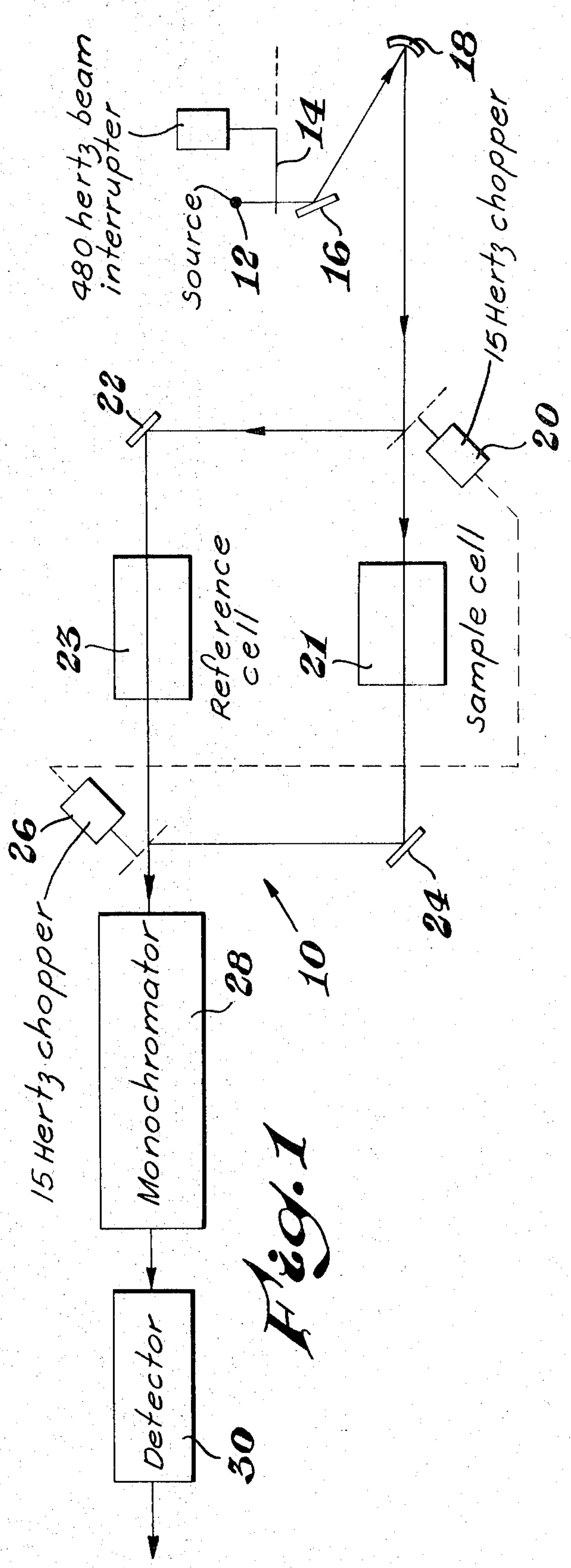
FIG. 1 is a diagrammatical view of one dual beam electrical ratioing spectrometer apparatus for use with this invention.

Referring to the drawing, and particularly to FIG. 1, there is shown dual beam electrical ratioing spectrometer apparatus, indicated generally by the numeral 10, comprising a suitable light source (an infrared source for use with an infrared spectrometer, for example), a 480 hertz chopper type beam interrupter, mirror 16, concave mirror 18, 15 hertz chopper 20, sample cell 21, reference cell 23, mirrors 22, 24, 15 hertz chopper 26, monochromator 28 and detector 30. The choppers 20 and 26 are synchronized with respect to each other.

Light from source 12 is interrupted at a rate of 480 hertz, reflected off mirror 16 and mirror 18 to the chopper 20 which passes light first through the sample cell 21 and then reflects the light to mirror 22 and thence through the reference cell 23, using a chopper disc which is half transparent and the other half a mirrored surface, for example.

Light from the reference is then reflected by mirror 24 to the chopper 26 where the light from the reference cell passes through the transparent half of the chopper disc to the monochromator 28 and the light from the sample cell is reflected toward the monochromator 28 whose output is then coupled to the detector 30, as is well known to those skilled in the art.

Figure 3:
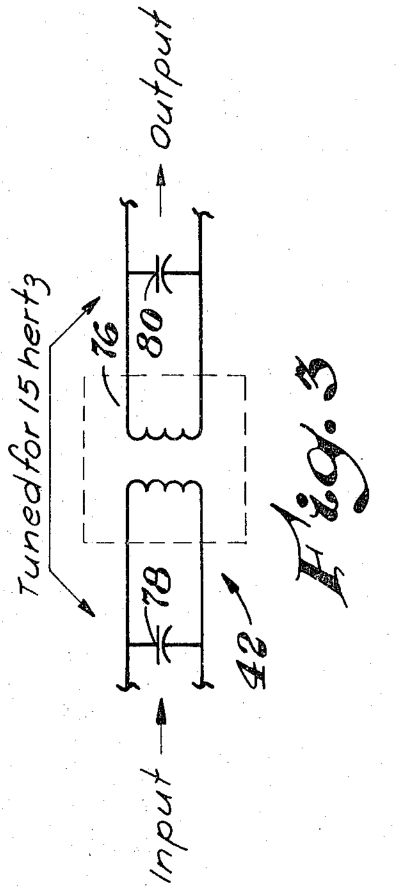
FIG. 3 is a schematic diagram of a parallel resonant circuit suitable for use in the circuit of FIG. 2.
Figure 2:
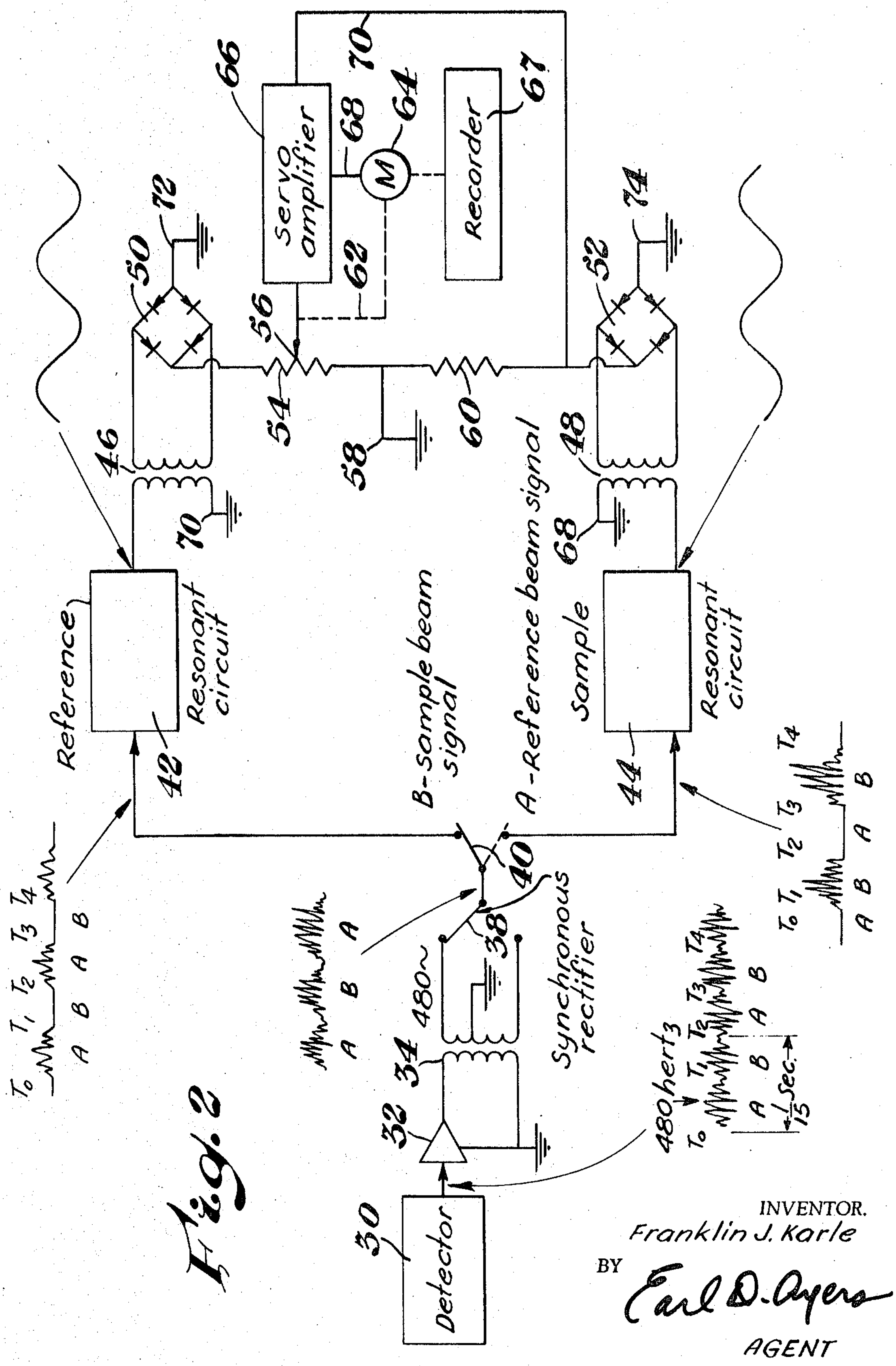
FIG. 2 is a simplified circuit, partly in block diagrammatical form, showing apparatus in accordance with this invention.

Referring now to FIG. 2, as well as to FIG. 3, the output of the detector 30, an electrical signal containing the 480 hertz component and phase displaced 15 hertz components, is coupled to an amplifier 32 whose output is coupled to a transformer 34 having a so called push-pull output which is coupled to a 480 hertz synchronous rectifier 38.

The output of rectifier 38 is coupled to a 15 hertz synchronous switch 40 to couple the sample beam signal, for example, to the input of the resonant circuit 44 and the reference beam signal to the reference resonant circuit 42, the signals now comprising time separated 15 hertz envelopes containing 480 hertz components, with the two signals being phase displaced.

The output of the sample resonant circuit 44 is coupled through transformer 48 whose primary winding is connected to the circuit 44 and ground 68 to a bridge rectifier 52 whose negative terminal is grounded as at 74 and whose positive terminal is coupled to ground, as at 58, through the fixed load resistance 60.

The transformer 46, whose primary is coupled to ground at 70, has its output coupled to a bridge rectifier 50. The rectifier 50 has its negative output terminal grounded, as at 72, and its positive terminal coupled to ground (at 58) through the slide wire of potentiometer 54.

The positive output of the sample circuit rectifier 52 also is coupled through the lead 70 to one input of a servoamplifier 66. The other input of the servoamplifier is electrically coupled to the moving contact of the potentiometer 54.

The output of the servoamplifier 66 is coupled to a drive motor 64 which is mechanically coupled to the movable contact 56 of potentiometer 54 and to the moving pin of a recorder 67, thus when a change in the voltage ratio of sample signal to reference signal causes an unbalance in the input to the servoamplifier 66 which causes the servo motor 64 to move the movable contact 56 to a position corresponding to the new signal ratio.

Since the reference and sample signals are composite signals made up primarily of 15 hertz and 480 hertz unsymmetrical wave shaped components, these composite signals contain a Fourier series of sine wave signal elements starting with the lower fundamental frequency being 15 hertz.

By using a Fourier transform circuit, of which the parallel resonant circuits 42, 44 are examples, the 15 cycle sine wave fundamental frequency is separated from the composite signal and appears at the output of the resonant circuit.

Because the sample and reference signals follow each other every $\frac{1}{30}$th second, they occur 180 degrees out of phase at the 15 hertz frequency.

By inverting the output of one of the 15 hertz sine waves from the output of the parallel resonant circuit, a direct ratio matching may be made between the sample and reference signals.

In the embodiment shown in FIG. 2, the bridge circuits 50 and 52 are used to alternately invert the negative portion of the output signals to furnish only positive voltage output signals, thus providing for continuous direct comparison between the sample and reference signals.

The resonant circuits 42, 44 are usually on the form shown in FIG. 3, comprising a transformer 76 having a capacitor 78, 80 coupled across the primary and secondary winding, respectively, to tune the circuit to 15 hertz, the low frequency used in choppers 20, 26, shown in FIG. 1.

One transformer 76 which has been successfully used is a Thordarson modulator transformer Model 21M67.

The light source 12 may be a Globar element or a Nichrome wire, for example if the spectrometer is an infrared type spectrometer. A mercury lamp or hydrogen lamp may be used as light sources if the spectrometer is an ultra violet type spectrometer.

It should be recognized that, with regard to FIG. 1, the optical signals arrive alternately at the detector 30, e.g., first arrives the light beam passing through the sample cell and then the light beam passing through the reference cell.

Examples of Fourier transformer means, besides the cited parallel resonant circuits, are frequency analyzers and narrow band pass amplifiers with negative feedback.

What is claimed is:

1. In a method of using a dual beam electrical ratioing spectrometer wherein a light beam which is interrupted at a relatively high frequency beam chopping rate is alternately directed at a low frequency beam chopping rate through a reference cell and a sample cell and then recombined and passed through a monochromator and detector to provide an electrical output signal containing both sample and reference signal components, the improvement comprising synchronously rectifying the output signal from said detector at said relatively high frequency rate, synchronously switching said rectified output signal of said detector at said low frequency rate and passing each of said sample and reference signal components of said rectified output signal through separate Fourier transform means, inverting the output of at least one of said Fourier transform means, and comparing said sample and reference signals to derive an output signal which is a function of the ratio of the sample signal to the reference signal.

2. A method in accordance with claim 1, including amplifying the output signal from said detector before it is synchronously rectified.

3. A method in accordance with claim 1, including the further step of making said relatively high frequency chopping rate at least several times the low frequency chopping rate.

4. A method in accordance with claim 1, including coupling said output signal which is a function of the ratio of the sample signal to the reference signal to readout means.

References Cited

UNITED STATES PATENTS 3,409,373 11/1968 Matthews.

RONALD L. WIBERT, Primary Examiner

V. P. McGRAW, Assistant Examiner

U.S. Cl. X.R.

250—83.3, 226